US008566896B2

(12) United States Patent
Riggsby et al.

(10) Patent No.: US 8,566,896 B2
(45) Date of Patent: Oct. 22, 2013

(54) ADDRESSABLE NETWORK INTERFACE UNITS SUITABLE FOR USE IN FTTX AND RFOG NETWORKS AND RELATED METHODS OF CONTROLLING BANDWIDTH ALLOCATION AND IDENTIFYING NOISE SOURCES IN SUCH NETWORKS

(75) Inventors: Robert Ryan Riggsby, Hickory, NC (US); Neil Phillips, Dove Canyon, CA (US); Mark Vogel, Statesville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 280 days.

(21) Appl. No.: 12/910,003

(22) Filed: Oct. 22, 2010

(65) Prior Publication Data

US 2011/0099601 A1    Apr. 28, 2011

Related U.S. Application Data

(60) Provisional application No. 61/254,423, filed on Oct. 23, 2009.

(51) Int. Cl.
    *H04N 7/173*      (2011.01)

(52) U.S. Cl.
    USPC ............. 725/127; 725/129; 725/149; 398/66; 398/67; 398/72; 398/115

(58) Field of Classification Search
    None
    See application file for complete search history.

(56) References Cited

U.S. PATENT DOCUMENTS

| | | | |
|---|---|---|---|
| 6,002,502 A | 12/1999 | Pomp et al. | |
| 6,049,693 A * | 4/2000 | Baran et al. | 725/124 |
| 6,674,967 B2 | 1/2004 | Skrobko et al. | |
| 6,687,907 B1 | 2/2004 | Bortolini | |
| 6,751,803 B1 * | 6/2004 | Matsuura | 725/127 |
| 2004/0221318 A1 * | 11/2004 | Chang et al. | 725/127 |
| 2005/0025485 A1 * | 2/2005 | Lee et al. | 398/71 |
| 2006/0113843 A1 * | 6/2006 | Beveridge | 307/43 |
| 2006/0168014 A1 * | 7/2006 | Wang | 709/206 |
| 2007/0107023 A1 * | 5/2007 | Versteeg et al. | 725/95 |
| 2007/0166043 A1 * | 7/2007 | Bouda et al. | 398/147 |
| 2007/0261094 A1 * | 11/2007 | Urbanek | 725/127 |
| 2008/0010488 A1 | 1/2008 | Riggsby | |
| 2008/0010512 A1 * | 1/2008 | Riggsby | 714/11 |
| 2008/0022344 A1 | 1/2008 | Riggsby | |
| 2009/0133095 A1 * | 5/2009 | Phillips et al. | 725/149 |

\* cited by examiner

Primary Examiner — Jason J Chung
Assistant Examiner — Cynthia Fogg
(74) Attorney, Agent, or Firm — Myers Bigel Sibley & Sajovec (57) ABSTRACT

An addressable optical network interface unit includes an optical input and a radio frequency output. The unit also includes an optical-to-electrical conversion circuit that converts optical signals received at the optical input into radio frequency signals, a directional coupler that is coupled to an output of the optical-to-electrical conversion circuit and a radio frequency receiver that is coupled to a first output of the directional coupler. The radio frequency receiver receives radio frequency signals input through the optical input. The unit also includes a controller that is coupled to the radio frequency receiver, and a filter circuit that is coupled to a second output of the directional coupler. The filter circuit includes multiple signal paths that filter out signals in different frequency ranges. Switches are provided that select one of the signal paths through the filter circuit. These switches are controlled in response to data contained in the radio frequency signal. The controller is configured to generate control signals that control the settings of at least some of the switches based at least in part on a filter control signal received through the optical input.

8 Claims, 7 Drawing Sheets

ADDRESSABLE NETWORK INTERFACE UNITS SUITABLE FOR USE IN FTTX AND RFOG NETWORKS AND RELATED METHODS OF CONTROLLING BANDWIDTH ALLOCATION AND IDENTIFYING NOISE SOURCES IN SUCH NETWORKS

CROSS-REFERENCE TO RELATED APPLICATION

The present application claims priority under 35 U.S.C. §119 from U.S. Provisional Patent Application Ser. No. 61/254,423, filed Oct. 23, 2009, the entire content of which is incorporated herein by reference as if set forth in its entirety.

FIELD OF THE INVENTION

The present invention generally relates to cable communications systems and, more particularly, to bandwidth allocation for cable television networks.

BACKGROUND

Cable television networks refer to communications networks that are used to transmit cable television signals and/or other information between one or more service providers and a plurality of subscribers over cable and/or fiber. Most conventional cable television networks comprise hybrid fiber-coaxial ("HFC") networks. In these networks, fiber optic cables are typically used to carry signals from the headend facilities of the service provider to various distribution points, while less expensive coaxial cable may be used, for example, to carry the signals into neighborhoods and/or into individual homes. In many cases, the proportion of an HFC network that comprises fiber is increasing. For example, many HFC networks are now implemented as Fiber-to-the Curb ("FTTC"), Fiber-to-the-Home ("FTTH") or RF over Glass ("RFoG") networks where the fiber portion of the network may extend down residential streets in the network (in FTTC applications) or all the way to individual customer premises (in FTTH) applications. FTTC and FTTH HFC networks may be generally referred to as "FTTx" or "RFoG" networks.

Typically, the service provider is a cable television company that may have exclusive rights to offer cable television services in a particular geographic area. The subscribers in a cable television network may include, for example, individual homes, apartments, hotels, etc., and various businesses and other entities. The service provider may broadcast a broad variety of cable television channels to subscribers over the cable television network. The cable television network may provide more channels, and often provide better signal quality, than "broadcast" television signals that may be received via the open airways.

The cable television service provider may offer subscribers a variety of different services. By way of example, typically several "tiers" of cable television service will be offered, ranging from, for example, a "basic" service that might include, for example, anywhere from about a dozen channel, to full service offerings that might include as many as several hundred channels. Premium movie and sports channels are often made available for a separate monthly subscription fee, and subscribers may also be able to order special packages of sporting or other events on a "pay-per-view" basis. Many cable television service providers also offer other services such as, for example, movies-on-demand which allow a customer to download a movie for viewing during a fixed time period or services completely unrelated to television including, for example, broadband Internet service and digital telephone service.

Consumers typically can choose from multiple service providers that offer television, Internet and telephone services. In addition, as noted above, often subscribers can choose from a range of service plans that provide varying levels of service at different price points. As a result of this range of choices, cable television network subscribers may fairly frequently add or drop service and/or change the service plan to which they subscribe. Each time this occurs, it may be necessary to configure the cable television network to provide the selected services to the subscriber in question.

A "tap" or "tap unit" refers to a connection to a communications line. In cable television networks, a tap unit is connected to a cable of the network in order to provide a port that carries signals between the network and a particular subscriber's premise (e.g., a house, apartment, business, etc.). An "addressable tap unit" is a tap unit that may be controlled (i.e., turned on or off) from a remote location. A cable television service provider may use such addressable tap units to activate or deactivate service to a particular subscriber from a remote location.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Addressable tap units are known in the art. For example, U.S. Patent Publication 2009/0133095, which is assigned to the assignee of the present application, discloses various addressable tap units that allow a cable network operator/service provider to, from a remote location, control which signals are passed in the downstream and/or the upstream direction between the cable service provider and the premises of subscribers that purchase services from the cable service provider. These addressable tap units are generally connected to a coaxial cable at or near a subscriber's home. A cable service provider may use the disclosed addressable tap units to add, drop and/or change the services provided to a particular subscriber premise without the need to send a service technician to the subscriber site.

As noted above, cable network service providers and other network providers are now installing RFoG, FTTC and FTTH HFC networks in which signals from a network head-end are transmitted over optical fibers to a location near or at subscriber premises. In such systems, a single wavelength of light is often used to carry all the information that was traditionally carried by the coaxial cable. A second wavelength of light may be used for upstream transmissions back to the head-end.

An optical network interface unit (NIU) is an enclosure that houses equipment for converting optical signals on an incoming fiber optic cable into electrical signals that can be used by a local network such as, for example, the coaxial cable network within individual subscriber premises that carries cable signals into individual rooms in the premises. These NIUs may also be referred to as Micro-Nodes, although the term NIU will be used for consistency of description throughout this disclosure. In a FTTH environment, the NIU typically marks the demarcation point between the outside fiber plant that is controlled by the service provider and the subscriber-owned network wiring. Typical NIUs may include a first input for receiving a fiber optic cable and a second input for receiving an electrical conductor such as a coaxial cable. The NIU may also include an optical-to-electrical converter for converting optical signals received on the optical fiber to electrical signals that can be transmitted over an electrical conductor such as a coaxial cable. The optical-to-electrical converter may comprise, for example, a photodiode that outputs electrical signals in response to received optical signals. The NIU may also include a laser that converts the electrical signals received from the home network into optical signals and transmits these optical signals upstream over the fiber optic cable.

While it is possible to use multiple downstream wavelengths to increase the amount of information transmitted from a head-end to a subscriber, the large bandwidth of each optical fiber (e.g., 1 GHz) means that a single wavelength is typically sufficient to carry all of the downstream data provided to any given subscriber. Thus, in FTTx applications, the downstream signals that were previously transmitted over a plurality of distinct frequency bands when the downstream signal was carried to the individual subscriber premises via an electrical coaxial conductor may now be transmitted as an optical signal that transmits in a single frequency band. As a result, the ability to control which portions of the downstream signal reach a given subscriber may be limited in FTTx HFC networks. Therefore, the various advantages of an addressable tap unit that are discussed, for example, in the aforementioned U.S. Patent Publication 2009/0133095 may be more difficult to obtain in FTTx HFC networks.

Pursuant to embodiments of the present invention, optical NIUs having addressable tap units (referred to herein as "addressable optical NIUs") are provided that may be used, for example, in FTTx HFC systems. The addressable tap unit may by coupled in these optical NIUs to the output of the optical-to-electric converter. Control signals for controlling the addressable tap unit may be sent to the optical NIU over the optical fiber, where they are converted to electrical control signals and used to control the addressable tap unit. In some embodiments, these control signals may control the addressable tap unit in the same manner as if an electrical signal had been sent from the head-end without an optical transmission portion.

Figure 1:
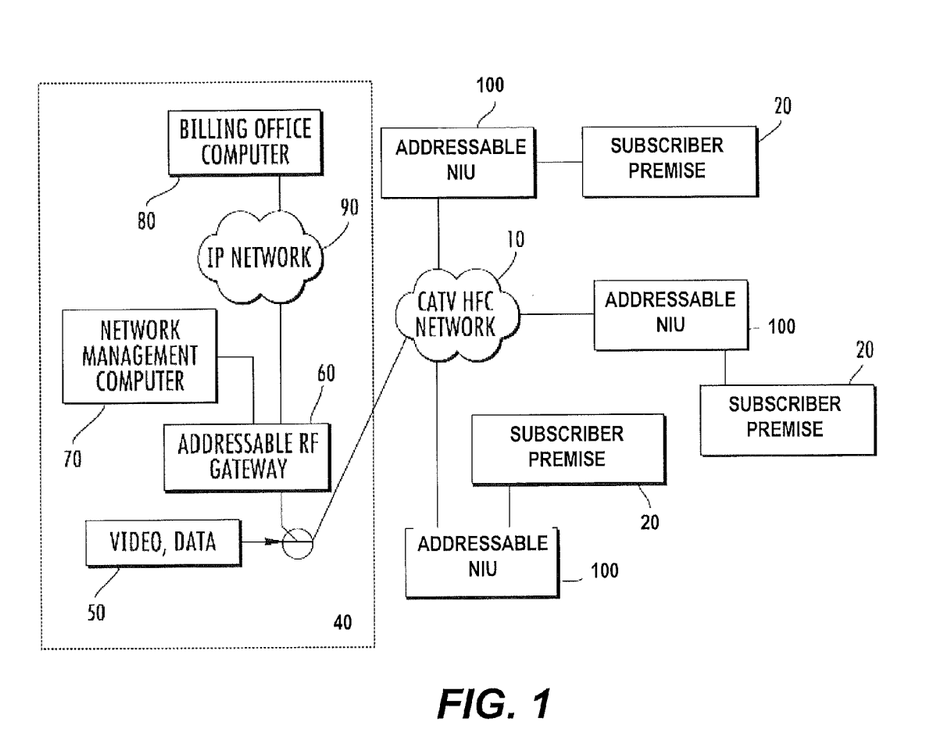
FIG. 1 is a block diagram illustrating an environment in which addressable optical network interface units ("NIUs") according to embodiments of the present invention may be used.

FIG. 1 is a block diagram illustrating an environment in which addressable optical NIUs 100 according to embodiments of the present invention that include addressable tap units may be used. As shown in FIG. 1, an HFC cable television network 10 provides cable television service and/or other services to a plurality of subscriber premises 20. In this particular example, the HFC network 10 is a pure FTTH network, and thus an addressable optical NIU 100 is provided at each subscriber premise 20 to convert the optical signals received over the HFC network 10 to electrical signals that can be distributed throughout, for example, a coaxial cable distribution network in the subscriber premises 20. In the present example of a FTTH network, the addressable optical NIUs 100 may be located, for example, outside each subscriber premise (e.g., on the outside of a building, in a cable box near the street, etc.). A cable service provider 40 provides audio, video and/or data signals 50 that are carried over the cable television network 10 to the subscriber premises 20.

As is further shown in FIG. 1, a gateway 60 at the cable service provider 40 receives commands from, for example, a control computer, and converts the commands into a signal that is sent to one or more of the addressable optical NIUs 100. The commands may be generated by control software running on the control computer. In certain embodiments of the present invention, the gateway 60 may be an addressable radio frequency gateway that includes a radio frequency frequency-shift-keying ("FSK") transmitter that converts the commands (which may be received, for example, over an RS-232 serial data connection or over an Ethernet connection) into a radio frequency ("RF") FSK carrier. This RF FSK carrier may then be combined with the audio, video and/or data signals 50 that are provided by the cable service provider and forwarded to the HFC network 10, where the RF signals are converted to optical signals for transmission over the optical fibers of the HFC network 10. In some embodiments of the present invention, the control computer may be a computer 80 located at a centralized location such as the billing office of the cable service provider, and may be connected to the gateway 60 over, for example, an Internet protocol ("IP") network 90. In other embodiments, the control computer may be a network management computer 70 that is located at the gateway 60 or at a remote location and in communication with the gateway 60 over an IP network or other communication link.

The addressable optical NIUs 100 according to embodiments of the present invention include filter circuits that may be used to select specific frequency bands in which signals will or will not be allowed to pass between the service provider 40 and an individual subscriber premise 20. By customizing the passband of the addressable optical NIUs 100 to more closely match the frequency bands on which individual subscribers receive services, it may be possible to reduce or minimize noise funneling in the return path. In addition, the addressable optical NIUs 100 according to embodiments of the present invention may be used to track noise in the cable network 10. Moreover, the addressable optical NIUs 100 may include non-interruptible contacts so that they may work with or without the filter circuit (which, in some embodiments may comprise a plug-in filter module) that allows for selective bandwidth control. Accordingly, the addressable optical NIUs 100 can initially be deployed without filter modules to reduce initial costs, and the plug-in filter modules may be added as needed later.

In some embodiments of the present invention, addressable optical NIUs 100 are provided that allow the cable service provider 40 (or other service provider) to remotely control the cable television and other signals 50 that are transmitted between the service provider 40 and a subscriber premise 20 in the 5 MHz to the 1000 MHz frequency band. Typically, "downstream" signals from the cable service provider 40 to subscriber premises 20 are transmitted in the 52-1000 MHz frequency band. These downstream signals may include, for example, the different tiers of cable television channels, movies on demand, digital telephone and/or Internet service (the signals received by the subscriber), and other broadcast or point-to-point offerings. Typically, the "upstream" signals from subscriber premises 20 to the cable service provider 40 are transmitted in the 5-40/42 MHz frequency band. These upstream signals may include, for example, digital telephone and/or Internet service (the signals transmitted by the subscriber) and ordering commands (i.e., for movies-on-demand and other services). The addressable optical NIUs 100 according to embodiments of the present invention may allow the cable service provider 40 to remotely "control" the bandwidth allocated to a subscriber premise 20 by setting an addressable tap unit 170 (see FIG. 2) of the addressable optical NIUs 100 to one of a plurality of states. By way of example, in one specific embodiment, each addressable tap unit 170 may be set to one of four different states:

1. "ON" mode—Passes the full downstream frequency band (typically from 52-1000 MHz) from the cable service provider 40 to the subscriber premise 20, and passes the full upstream frequency band (typically from 5-40/42 MHz) from the subscriber premise 20 to the cable service provider 40.
2. "OFF" mode—Does not pass any signals between the cable service provider 40 and the subscriber premise 20 in either the upstream or the downstream frequency bands.
3. "HIGH PASS" mode—Passes the full downstream frequency band from the cable service provider 40 to the subscriber premise 20, while blocking the full upstream frequency band from the subscriber premise 20 to the cable service provider 40.
4. "WINDOW" mode—Passes selected portions of the downstream frequency band from the cable service provider 40 to the subscriber premise 20, and passes selected portions of the upstream frequency band from the subscriber premise 20 to the cable service provider 40. The WINDOW mode may be used to pass frequencies associated with one or more specific tier(s) of services which an individual subscriber has ordered.

It will be appreciated that different cable service providers 40 offer different services over different frequency bands. As such, the setting of the WINDOW mode may be customized for individual cable service providers 40 based on the services they offer and the frequency band allocation for those services. It will be appreciated that in other embodiments, each addressable tap unit 170 may have fewer than, or more than, four different modes. By way of example, several different WINDOW modes may be provided in some embodiments.

In many instances, particular subscribers will not utilize all of the services provided over the full bandwidth (typically 5-1000 MHz) of the HFC network 10. For example, some subscribers may only order cable television and digital telephone service from their cable service provider 40, while choosing not to subscribe to cable Internet service, movies on demand and other service options. Consequently, only a small portion (e.g., 5 MHz) of the upstream frequency band from these subscriber premises 20 to the cable service provider 40 may be required. Using the addressable optical NIUs 100 according to embodiments of the present invention, the amount of bandwidth provided to individual subscriber premises 20 may be remotely controlled by the cable service provider 40, thereby making it easy and convenient to filter out frequency bands that are not being used by individual subscribers. This may allow cable service providers 40 to more easily control the services that are made available to individual subscribers (so that such subscribers do not receive services that they are not paying for), and also allows the cable service provider 40 to reduce the amount of noise introduced into the HFC network 10 from individual subscriber premises 20.

The addressable optical NIUs 100 according to embodiments of the present invention may also allow cable service providers 40 to reduce or eliminate the need for set top boxes. By way of example, in many current cable television networks, analog cable television signals are transmitted in the 52-550 MHz frequency band, while digital cable television signals are transmitted in the 550-860 MHz frequency band. By using the WINDOW mode feature of the addressable tap units 170 included in the addressable optical NIUs 100, a cable service provider 40 can remotely control which signals are delivered to individual subscriber premises 20. Thus, the addressable optical NIUs 100 according to embodiments of the present invention may, in some situations, be used instead of set top boxes to control the services that are provided to individual subscriber premises 20.

The control software that runs on the control computer 70 or 80 may include a user interface that allows an operator to readily input changes in the services that are being provided to a subscriber. The control software may automatically generate the above-discussed commands that are forwarded to the gateway 60 and then sent to the addressable optical NIU 100 in response to the input of this information. Thus, in some embodiments of the present invention, the updating of a subscriber's service profile by an operator may automatically result in reconfiguration of an addressable tap unit 170 of an addressable optical NIUs 100 so as to change the actual services provided to the subscriber. The cable service provider billing office may be a convenient place to locate the control software as the billing office typically receives information regarding all changes in service to individual subscribers, and the addressable tap units 40 may thus be automatically reprogrammed each time a change in service is received at the billing office and entered into the computer system.

Figure 2:
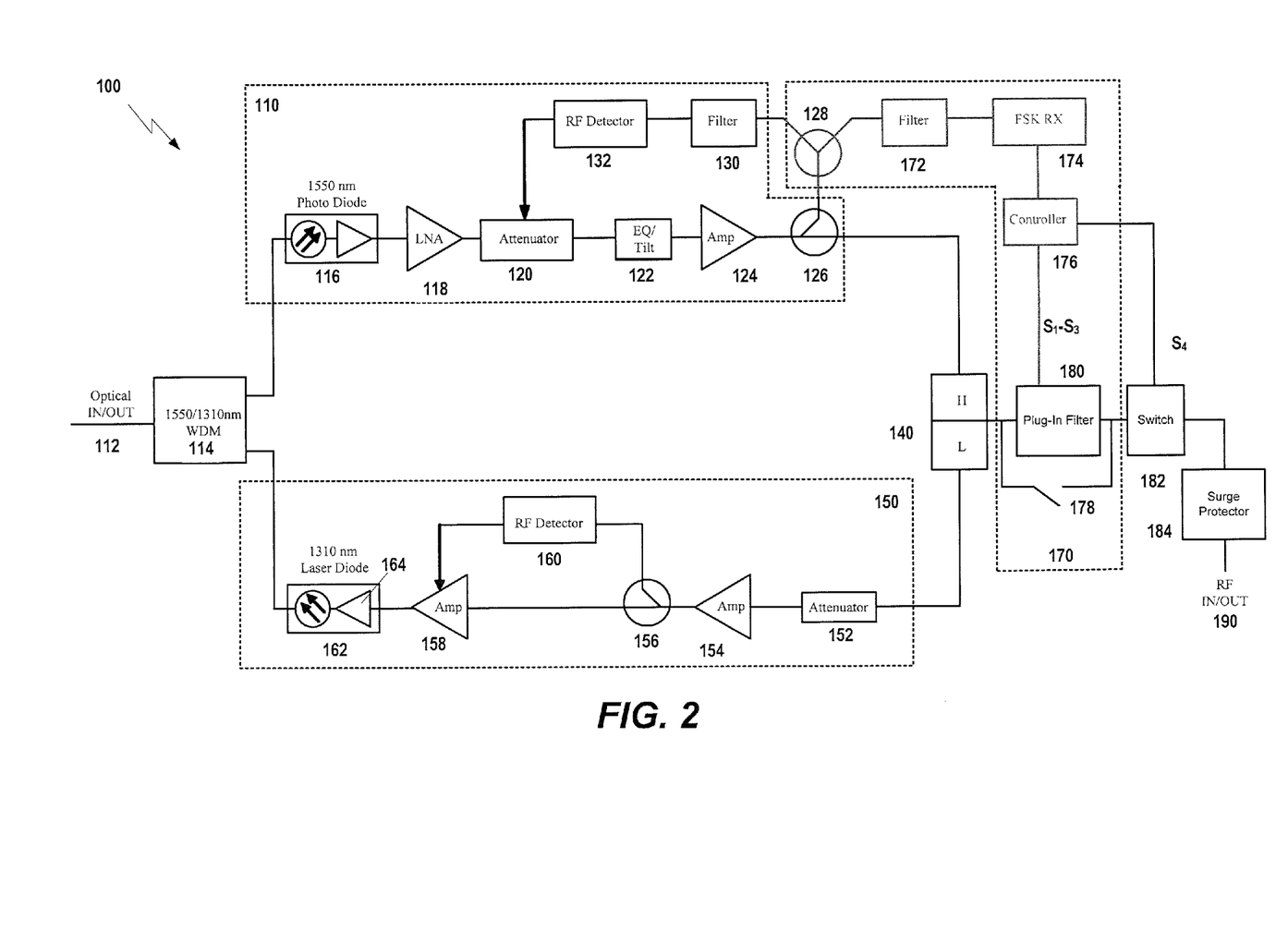
FIG. 2 is a block diagram of an addressable optical NIU according to certain embodiments of the present invention.

FIG. 2 is a block diagram of an addressable optical NIU 100 according to certain embodiments of the present invention. As shown in FIG. 2, the addressable optical NIU 100 includes, among other things, a downstream signal conversion unit 110 that converts downstream optical signals from the HFC network into electrical signals, an upstream signal conversion unit 150 that converts upstream electrical signals from the subscriber premises into optical signals, and an addressable tap unit 170.

As shown in FIG. 2, the addressable optical NIU 100 further includes an optical diplexer 114 that receives an optical signal from an optical input/output 112 from/to the HFC network 10 and that outputs optical signals to the HFC network 10. The optical signal may comprise, for example, downstream cable television and/or data signals that are broadcast by the cable service provider 40. In some embodiments, the optical diplexer 114 may receive a single 1550 nm downstream optical signal from the HFC network 10, and may output a single 1310 nm or 1610 nm upstream optical signal to the HFC network 10. The optical diplexer 114 provides the received 1550 nm downstream optical signal to an optical-to-electrical conversion unit 116 which may comprise, for example, a 1550 nm photo diode unit 116 that converts the received downstream optical signal into an electrical signal. The output of the photo diode unit 116 is provided to a low noise amplifier 118 that amplifies the electrical signal to a desired level. The output of the low noise amplifier 118 is input to an adaptive attenuator 120. The output from the attenuator 120 is provided to an equalizer 122 that is used to smooth frequency dependent variations in the electrical signal. The signal output from the equalizer 122 is then amplified by amplifier 124 and provided to a directional coupler 126.

As shown in FIG. 2, the first (upper) branch of the directional coupler 126 is fed to a second directional coupler 128. The first (left) output of the directional coupler 128 is fed to a filter 130, and the output of the filter 130 is provided to an RF detector 132 that detects the RF power level of the signal received from the filter 130. The output of the RF detector 132 is fed to the adaptive attenuator 120, where it is used to control the degree of attenuation that is performed on the signal input to attenuator 120. Thus, the feedback loop provided by components 126, 128, 130 and 132 may be used so that the RF output power level of the signal output from adaptive attenuator 120 is relatively constant. The directional couplers 126, 128 may be splitters that equally split the power of the signals input thereto, or may unequally split the signal between the two output paths.

The second (lower) branch of the directional coupler 126 is provided to a hi-low diplexer 140. The output of the hi-low diplexer 140 is input to a plug-in filter unit 180 that is discussed in further detail below. The output of the plug-in filter unit 180 is passed to a switch 182, and the output of the switch 182 is fed to an input/output port 190 of the subscriber premises coaxial cable network. A surge protector 184 may be provided between the switch 182 and the subscriber premises coaxial cable network.

The upstream signal conversion unit 150 is also interposed between the input/output port 190 of the subscriber premises coaxial cable network and the optical diplexer 114. As shown in FIG. 2, upstream signals that are transmitted from the subscriber premises coaxial cable network pass through the surge protector 184, the switch 182 and the plug-in filter 180 to the hi-low diplexer 140. The hi-low diplexer 140 separates the upstream signals from the subscriber premises coaxial cable network, which typically are in the 5-40/42 MHz frequency band (or a subset thereof) from the downstream signals transmitted by the cable service provider, which are typically in the 52-1000 MHz frequency band (or a subset thereof). Thus, only the upstream signals pass through the "low" side of the hi-low diplexer 140 to the upstream signal conversion unit 150.

The upstream signal conversion unit 150 includes an attenuator 152 that receives the upstream signals from the hi-low diplexer 140. The output of the attenuator 152 is amplified by amplifier 154. The output of the amplifier 154 is provided to a directional coupler 156. The first (lower) branch of the directional coupler 156 is fed to an amplifier 158, and the second (upper) branch of the directional coupler 156 is fed to an RF detector 160 that outputs a control signal to the amplifier 158. The directional coupler 156, the RF detector 160 and the amplifier 158 act as a squelch unit that blocks unwanted signals from passing through the addressable optical NIU 100 in the upstream direction. In particular, if the RF signal input to RF detector 160 is below a specified threshold (or if no RF signal is present), the RF detector 160 will turn the laser bias off. When the RF signal input to RF detector 160 is above the specified threshold, the RF detector 160 will turn the laser bias on, and the amplifier 158 may be driven in its normal operating mode. The laser diode 164 in the electrical-to-optical conversion unit 162 converts the RF electrical signal into an optical signal and transmits the generated optical signal onto an optical fiber connecting the electrical-to-optical conversion unit 162 to the optical diplexer 114. The optical upstream signal is then passed through the optical diplexer 114 to the optical input/output 112 where it passes to the HFC network 10.

As noted above, the addressable optical NIU 100 further includes an addressable tap unit 170. This addressable tap unit includes filter 172 that is connected to the second (right) branch of directional coupler 128. The filter 172 may comprise, for example, a pass-band filter that passes RF signals received from directional coupler 128 in a frequency band over which control signals are transmitted from the cable service provider 40 to individual subscriber premises 20. In some embodiments, the filter 172 may pass some or all signals in the 60-110 MHz frequency band, although it will be appreciated that numerous other filter implementations are possible.

The output of the filter 172 is passed to a receiver 174. In some embodiments, the receiver 174 may comprise, for example, a radio frequency FSK receiver 174 having demodulation capabilities. Command signals received from the HFC network 10 are converted to electrical signals by the optical-to-electrical conversion unit 116 and then coupled to the FSK receiver 174 via the directional couplers 126, 128 and the filter 172. The FSK receiver 174 may receive and demodulate these command signals and provide the demodulated command signals to a controller 176 which may be implemented, for example, as a microcontroller or other processing unit. The command signals may include data that is used by the controller 176 to determine settings for a plurality of switches that are part of the plug-in filter circuit 180. The command signals may also include data that is used by the controller 176 to determine how the switch 182 is set. In response to a received and demodulated command signal, the controller 176 may set a plurality of control signals $S_1$-$S_4$ that are used to control the setting of the switch 182 (via control signal $S_4$) and the switches in the plug-in filter circuit 180 (not pictured in FIG. 3).

As noted above, filter circuit 180 may comprise a "plug-in" filter circuit. By "plug-in" it is meant that the filter circuit 180 is configured to be field-installable and/or field-removable by inserting the filter circuit 180 into a mating slot, recess, housing and/or other receptacle in or on the addressable optical NIU 100. The "plug-in" filter circuit 180 includes electrical contacts that mate with corresponding electrical contacts in the filter slot, recess, housing and/or other receptacle. As such, a technician may readily install and/or replace these plug-in filter circuit 180 in the field simply by pulling out any filter circuit that is to be replaced and plugging a new filter circuit 180 into the filter slot, recess, housing and/or other receptacle. It will be appreciated that one or more retainment mechanisms such as snap latches, clips, screws or the like may be included that ensure that the filter circuit 180 remains firmly in place after it is plugged in. Such retainment mechanisms may need to be disengaged or removed in order to remove one plug-in filter circuit and replace it with another plug-in filter circuit. It will also be appreciated that in some embodiments of the present invention the filter circuit 180 may not be a plug-in filter circuit.

As is also shown in FIG. 2, the addressable tap unit 170 also includes a "non-interruptible" plug-in filter contact 178. The non-interruptible plug-in filter contact 178 allows continual maintenance of a radio frequency path through the addressable tap unit 170 even when the plug-in filter circuit 180 is not inserted into the addressable tap unit 170. By way of example, the addressable tap unit 170 may initially be deployed without the plug-in filter circuit 180 in order to reduce the initial deployment costs. Thereafter, a technician may install the plug-in filter circuit 180. Insertion of the plug-in filter circuit 180 disables the non-interruptible plug-in filter contact 178. The contact 178 is referred to as a "non-interruptible" contact because it is configured so that a significant (or, in some cases, even a noticeable) break will not occur in downstream service when the plug-in filter circuit 180 is plugged into, or removed from, the addressable tap unit 170.

The non-interruptible plug-in filter contact 178 provides an alternate signal carrying path that bypasses the plug-in filter circuit 180. In some embodiments, the non-interruptible plug-in filter contact 178 may be implemented as a signal carrying path that is mechanically open-circuited when the plug-in filter circuit 180 is plugged into the addressable tap unit 170. In one specific embodiment, the non-interruptible plug-in filter contact 178 may be implemented as a metal contact beam that is shaped to have good contact force and elastic "memory." When the non-interruptible plug-in filter contact 178 is "engaged" (which occurs when the plug-in filter unit 180 is not installed in the addressable tap unit 170), the non-interruptible metal contact beam 178 makes mechanical and electrical contact between a radio frequency input point and a radio frequency output point to provide an alternate radio frequency path. In contrast, when plug-in filter unit 180 is installed in the addressable tap unit 170, the filter unit 180 mechanically moves the non-interruptible metal contact beam 178, thereby open-circuiting the alternate radio frequency path. The non-interruptible metal contact beam 178 is designed so that upon removal of the plug-in filter unit 180, the non-interruptible metal contact beam 178 immediately re-establishes the alternate radio frequency path to ensure that no significant and/or noticeable service break occurs.

Figure 3:
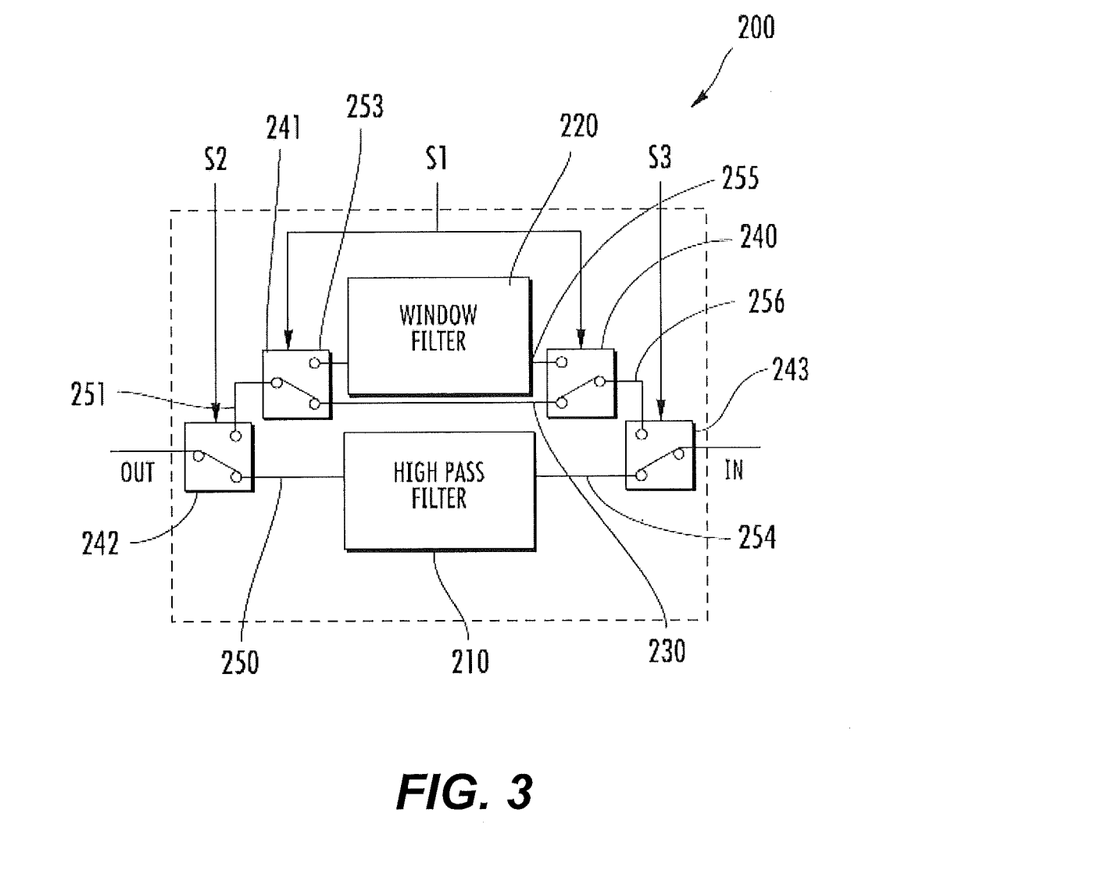
FIG. 3 is a block diagram of an embodiment of a plug-in filter circuit that is included in the addressable optical NIU of FIG. 2.

FIG. 3 is a block diagram of a plug-in filter circuit 200 according to certain embodiments of the present invention that may be used to implement plug-in filter circuit 180 of FIG. 2. As shown in FIG. 3, plug-in filter circuit 200 may include a high pass filter 210, a window filter 220, a filter free signal carrying path 230 and switches 240-243. The high pass filter 210 comprises a high pass filter that passes signals having a frequency above, for example, 52 MHz while attenuating lower frequency signals. The window filter 220 comprises a bandpass filter that passes signals in one or more selected frequency ranges within, for example, the 5-1000 MHz frequency band while attenuating signals in other frequency ranges. By way of example, the window filter 220 may be configured to pass signals in frequency bands that provide a subscriber with 911 digital telephone service and standard cable television service, while attenuating/blocking signals in all other frequency ranges and thus disabling other services such as normal digital telephone service, premium cable television service and pay-per-view and movies-on-demand services.

The switches 240-243 comprise two-position switches that are configured to open one of two possible signal paths and close the other signal path in response to a control signal that is applied to the switch. The switches 240-243 are controlled by control signals $S_1$-$S_3$ which are generated by, for example, the controller 176, as shown in FIG. 2. As shown in FIG. 3, control signal $S_1$ controls switches 240 and 241, control signal $S_2$ controls switch 242, and control signal $S_3$ controls switch 243. It will also be appreciated that some or all of the plurality of switches 240-243 may be implemented as, for example, four position switches.

The plug-in filter circuit 200 may be set to one of four different modes (ON, OFF, HIGH PASS, WINDOW) by application of the control signals $S_1$-$S_3$ to switches 240-243. For example, the addressable tap unit 170 of FIG. 2 may be set to the ON mode that is discussed above by setting control signal $S_2$ so that switch 242 connects to path 251, setting control signal $S_1$ so that switches 240 and 241 connect to the filter free signal carrying path 230, and setting control signal $S_3$ so that switch 243 connects to path 256. In this manner, signals incident at the input of either switch 242 or switch 243 flow through the unfiltered signal carrying path 230, and hence all signals in the downstream and upstream frequency bands may be passed between the subscriber premise 20 and the cable television service provider 40.

Similarly, in order to set the addressable tap unit 170 of addressable optical NIU 100 of FIG. 2 to the OFF mode, control signal $S_2$ is set so that switch 242 connects to path 251, while control signal $S_3$ is set so that switch 243 connects to path 254. Switches 240 and 241 may be set to either position. In this manner, signals incident at the input of either switch 242 or switch 243 face an open circuit within the plug-in filter circuit 200. As such, when set to the OFF mode, no signals are passed between the subscriber and the cable television service provider.

In order to set the addressable tap unit 170 of FIG. 2 to the HIGH PASS mode, control signal $S_2$ is set so that switch 242 connects to path 250, while control signal $S_3$ is set so that switch 243 connects to path 254. Switches 240 and 241 may be set to either position. In this manner, signals incident at the input of either switch 242 or switch 243 flow through signal paths 250 and 254 and the high pass filter 210. As discussed above, the high pass filter 210 only passes high frequency signals (e.g., signals at frequencies above 50 MHz) between the subscriber and the cable television service provider, thereby implementing the HIGH PASS mode of operation.

In order to set the addressable tap unit 170 of FIG. 2 to the WINDOW mode, control signal $S_2$ is set so that switch 242 connects to path 251, control signal $S_1$ is set so that switch 241 connects to path 253 and switch 240 connects to path 255, and control signal $S_3$ is set so that switch 243 connects to path 256. In this manner, signals incident at the input of either switch 242 or switch 243 flow through signal paths 251, 253, 255 and 256 and the window filter 220. As discussed above, the window filter 220 only passes signals in selected frequency ranges within, for example, the 5-1000 MHz frequency band while attenuating signals in other frequency ranges, thereby implementing the WINDOW mode of operation.

While the above description illustrates switch settings that may be used to set each of the four modes, it will be appreciated that other switch settings may also be used to implement the various modes.

Figure 4A:
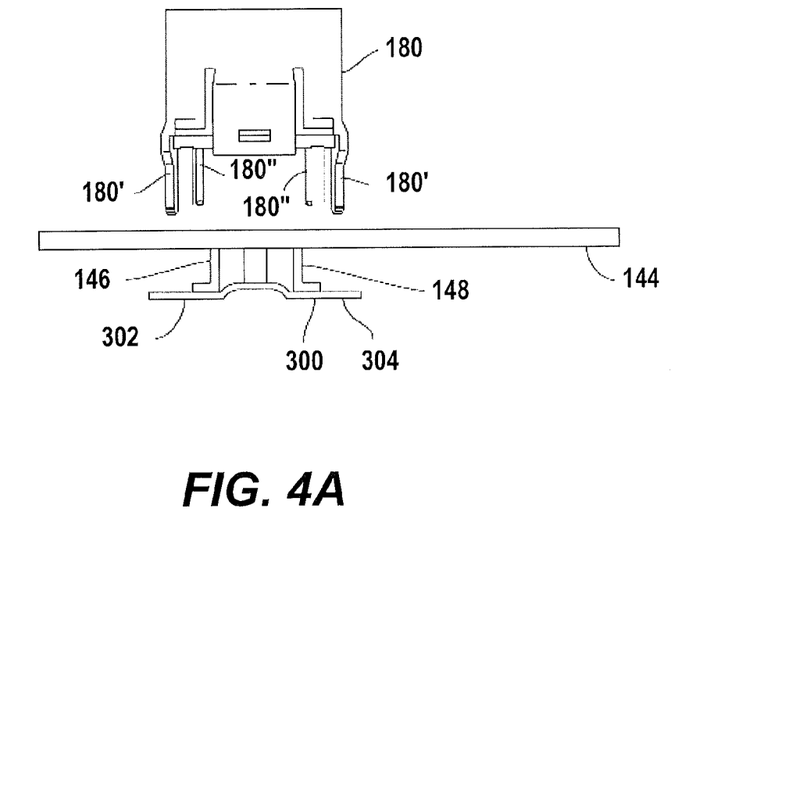
FIGS. 4A-4B are schematic side views of a non-interruptible plug-in filter contact in engaged and disengaged positions, respectively, according to certain embodiments of the present invention.
Figure 4B:
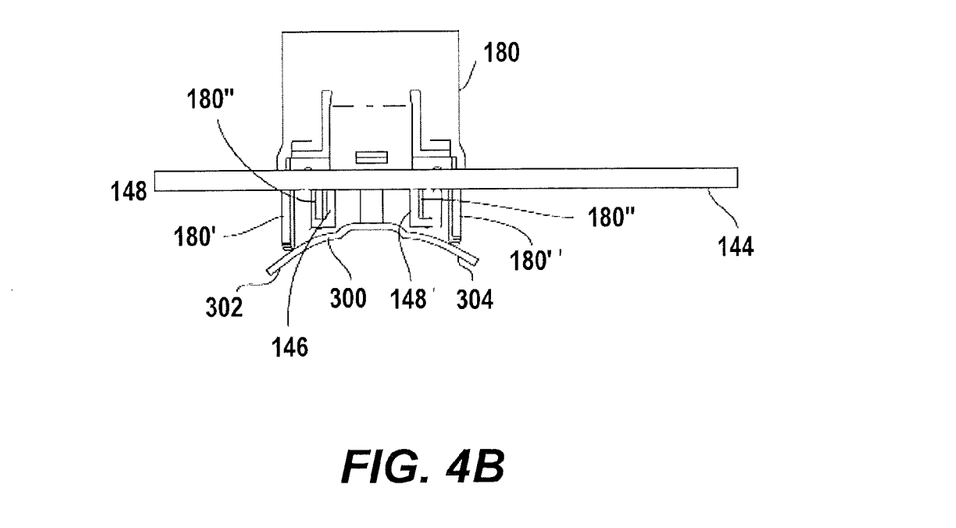

FIGS. 4A and 4B illustrate one implementation of the non-interruptible plug-in filter contact 300 according to embodiments of the present invention that may be used to implement the non-interruptible plug-in filter contact 178 of FIG. 2. The non-interruptible plug-in filter contact 300 comprises a flat, elongated piece of metal that has first and second ends 302, 304. As shown in FIG. 4A, in its engaged position, the first end 302 connects to a first contact post 146 that is electrically connected via a printed circuit board 144 to the output of the hi-low diplexer 140 (see FIG. 2). In this resting position, the second end 304 of non-interruptible plug-in filter contact 300 connects to a second contact post 148 that is electrically connected via a printed circuit board 144 to the input to switch 182 (see FIG. 2). As shown in FIG. 4A, in the engaged position, the non-interruptible plug-in filter contact 300 provides a radio frequency path that connects the output of the hi-low diplexer 140 to the input to switch 182 via the contact posts 146, 148.

As is also shown in FIGS. 4A and 4B, the plug-in filter circuit 180 may have a pair of protrusions 180' extending from a bottom surface thereof. As is shown in FIG. 4B, when the plug-in filter circuit 180 is inserted into the printed circuit board 144, these protrusions 180' pass through apertures in the printed circuit board 144 to contact the respective ends 302, 304 of the non-interruptible plug-in filter contact 300 to move the ends 302, 304 downwardly, thereby open-circuiting the radio frequency path that otherwise connects the contact post 146 that is electrically connected to the output of the hi-low diplexer 140 to the contact post 148 that is electrically connected to the input to switch 182. As is also shown in FIG. 4B, when the plug-in filter circuit 180 is inserted into the printed circuit board 144, a first contact protrusion 180" on the plug-in filter circuit 180 passes through an aperture in the printed circuit board 144 to make mechanical and electrical contact with the contact post 146, and a second contact 180" on the plug-in filter circuit 180 passes through a fourth aperture in the printed circuit board 144 to make mechanical and electrical contact with the contact post 148. These first and second contacts 180" thus establish a radio frequency path between the output of the hi-low diplexer 140 and the input to switch 182 that passes through the plug-in filter circuit 180. When the plug-in filter circuit 180 is removed, the resilient non-interruptible plug-in filter contact 300 springs back into its normal resting (engaged) position, thereby returning to the position depicted in FIG. 4A, re-establishing the radio frequency path through the non-interruptible plug-in filter contact 300 that connects the output of the hi-low diplexer 140 to the input to switch 182.

Referring again to FIG. 2, the switch 182 is coupled between the plug-in filter circuit 180 and the surge protector 184. In some embodiments, the switch 182 may comprise a CMOS switch. The switch 182 is provided to allow the addressable tap unit 170 to operate in the ON and OFF modes even if no plug-in filter circuit 180 is plugged into the addressable optical NIU 100. To provide for operation in the ON mode, the CMOS switch 182 is set to provide a direct path between plug-in filter unit 180 and surge protector 184. In contrast, to provide for operation in the OFF mode, the CMOS switch 182 is set to terminate the output of plug-in filter 180 to a 75 ohm termination (not shown), thereby disengaging subscriber premise 20 from the cable TV network 10.

The addressable optical NIUs according to embodiments of the present invention may also address an issue that may arise with digital telephone service. Digital telephone service is typically provided over somewhere between a 52 to a 150 MHz frequency band. If a subscriber falls behind in payment, the cable service provider may cut off service to the subscriber. However, in many jurisdictions, laws or ordinances may prevent the cable service provider from cutting off emergency telephone service such as 611 or 911 telephone service. Accordingly, addressable optical NIUs may be provided according to embodiments of the present invention that use an appropriate filter circuit that has a first mode which allows for full digital telephone service, and a second mode that filters out most of the digital telephone frequency band while retaining 611 or 911 service. Such addressable optical NIUs may provide a convenient way for cable television service providers to restrict the range of services provided to delinquent customers while complying with applicable laws and reducing the amount of noise in the cable network.

Pursuant to further embodiments of the present invention, the addressable optical NIUs may facilitate identifying the sources of "upstream" noise that are introduced into the HFC network (i.e., noise that is introduced at subscriber ports). When noise is detected on conventional cable television networks, typically a manual effort is made to determine the node where the noise is entering the network. For example, a service technician may be sent out who physically connects and disconnects taps. A network management computer may be used to track how the noise level in the cable television network varies as each tap is turned on and off in order to identify taps that are introducing significant noise into the network. This process may be expensive and time-consuming, and may also interrupt service to selected customers.

However, an operator may, from a remote location, use the addressable optical NIUs according to embodiments of the present invention to turn each addressable optical NIU associated with the effected node on and off (typically in the upstream direction only). This may be done by a few simple keystrokes or, alternatively, by software that automatically turns individual and/or groups of addressable optical NIUs on and off and measures the noise present on the network both before and after the addressable optical NIUs are turned off. In this manner, a cable service provider may quickly and efficiently track the noise contribution of individual subscribers, isolate the taps which appear to be the major contributors to the noise introduced onto the network, and/or determine the frequency bands that are the primary contributors to noise inserted into the network from a particular subscriber location. If immediate correction is required, the operator can leave the upstream path to the identified subscriber(s) turned off, thereby reducing or eliminating the noise problem, while maintaining downstream services to these subscribers. The identified subscribers may then be contacted and a convenient time scheduled for a service call where a technician can replace equipment as necessary to rectify the noise problem.

Figure 5:
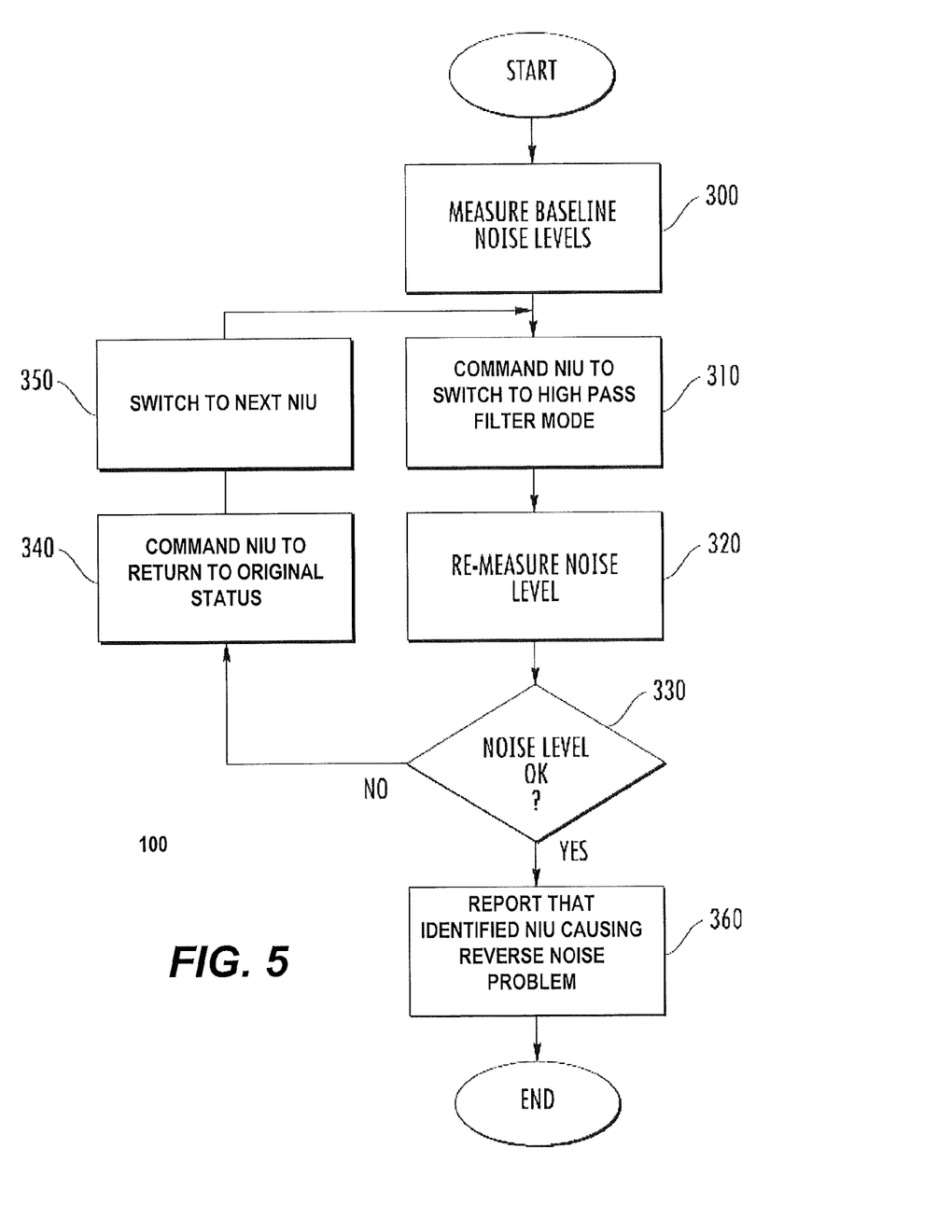
FIG. 5 is a flow chart depicting methods of identifying upstream noise sources in cable television networks according to certain embodiments of the present invention.

FIG. 5 is a flow chart depicting operations for identifying noise sources in cable television networks according to certain embodiments of the present invention. As shown in FIG. 5, operations may begin with measurement of a baseline noise level in the network (block 300). Next, a radio frequency signal is sent to an addressable tap unit of an addressable optical NIU that includes a command for the addressable tap unit to reduce the upstream bandwidth between the cable television network and the addressable tap unit (block 310). This may be accomplished, for example, by commanding the addressable tap unit to the high pass mode. Once the addressable tap unit responds to this command, the noise level is then re-measured in order to determine the contribution that the addressable optical NIU is making to the overall noise level in the network (block 320).

At block 330 of FIG. 5, a decision is made as to whether or not the re-measured noise level is acceptable. If it is, this indicates that the addressable optical NIU was the cause of the reverse noise problem. Accordingly, a report or alert may be issued identifying the addressable optical NIU as the cause of the reverse noise problem, and operations then end (block 360). If, on the other hand, at decision block 330 it is determined that the re-measured noise level still remains unacceptable, then operations continue with a command to the addressable tap unit to return to its original status (block 340). Next, a second addressable optical NIU in the network is selected (block 350) and operations continue at block 310 so that the operations are repeated on this second addressable optical NIU. Operations may continue with respect to additional addressable optical NIUs until the noise source is identified and/or until all of the addressable optical NIUs in the network have been tested.

Figure 6A:
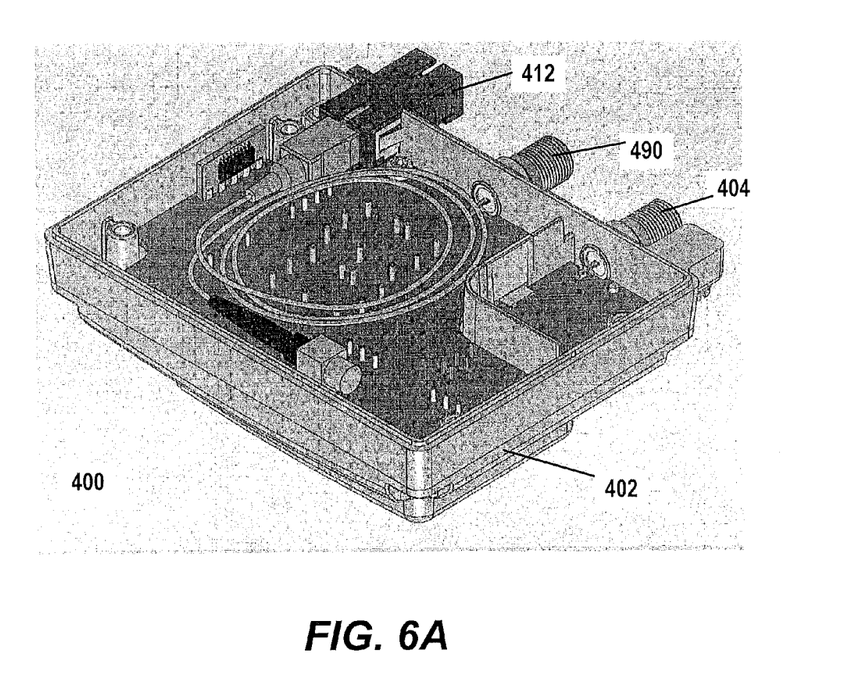
FIG. 6A is a perspective top view of a housing of an addressable optical NIU according to certain embodiments of the present invention with the circuitry installed therein.
Figure 6B:
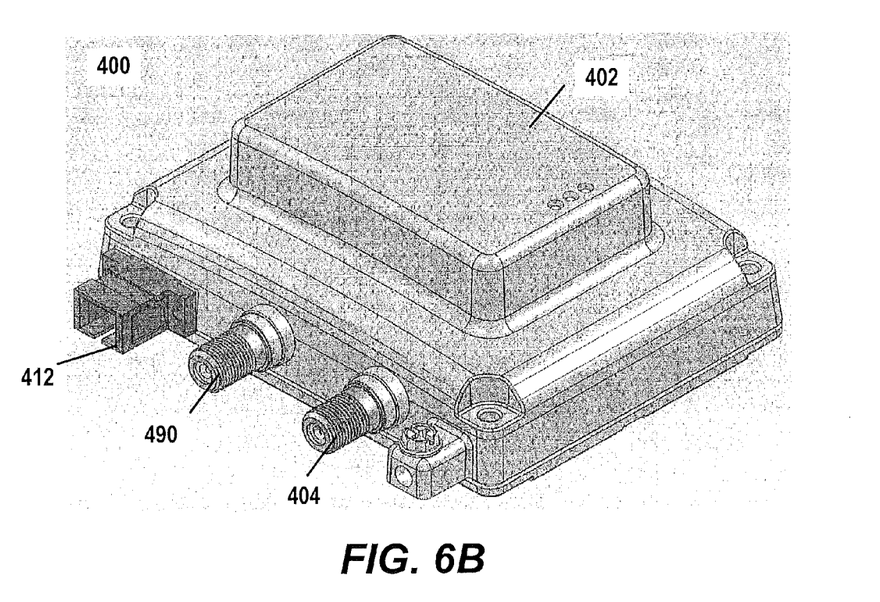
FIG. 6B is a perspective bottom view of the housing of the addressable optical NIU of FIG. 6A.
Figure 6C:
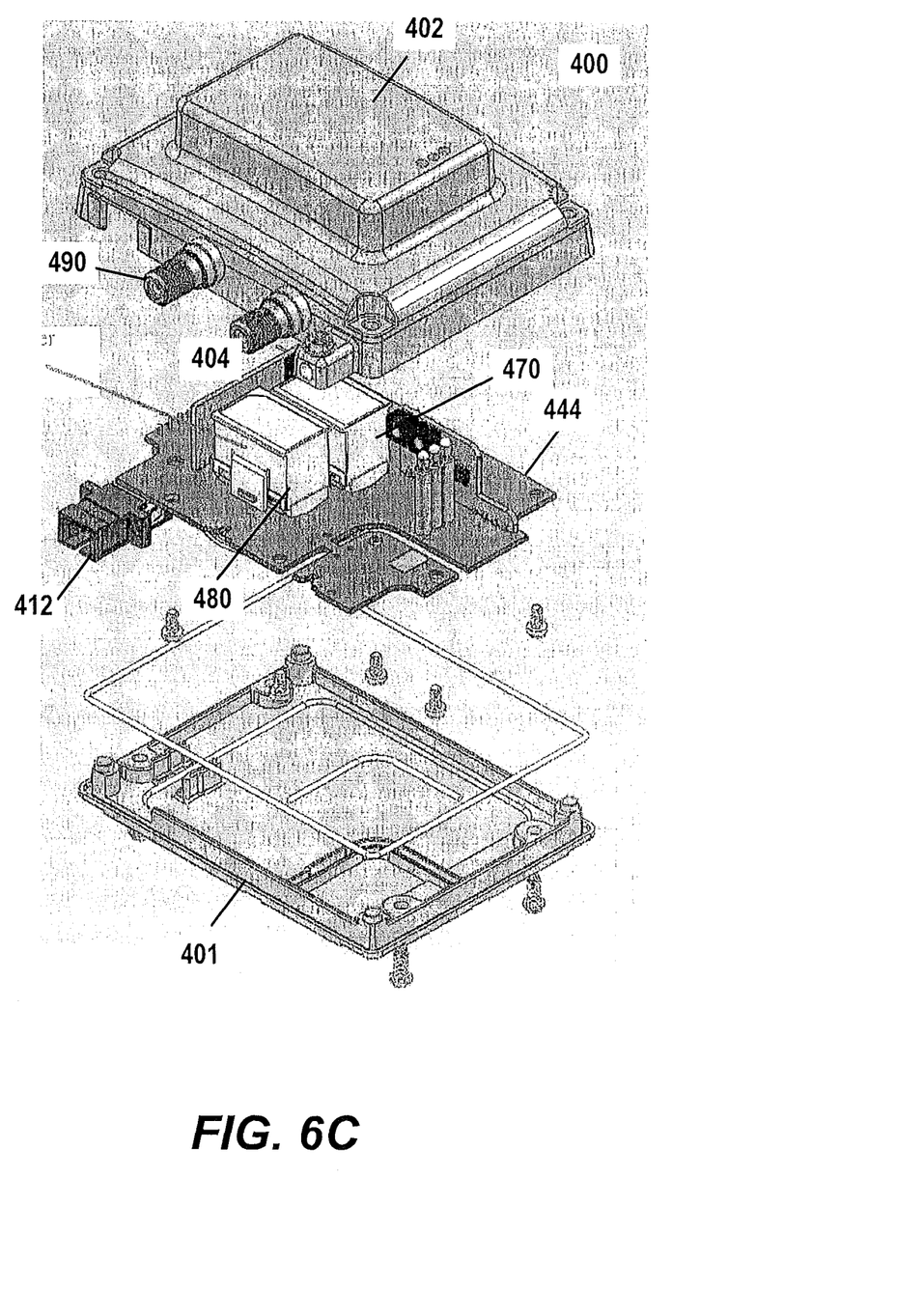
FIG. 6C is an exploded perspective bottom view of the addressable optical NIU of FIG. 6A.

FIG. 6A is a perspective top view of a housing of an addressable optical NIU 400 according to certain embodiments of the present invention with the circuitry installed therein. FIG. 6B is a perspective bottom view of the housing of the addressable optical NIU 400 of FIG. 6A. FIG. 6C is an exploded perspective bottom view of the addressable optical NIU 400 of FIG. 6A.

The addressable optical NIU 400 may correspond to, for example, addressable optical NIU 100 of FIG. 2. As shown in FIGS. 6A-6C, the addressable optical NIU 400 includes a faceplate 401 and a housing 402. In some embodiments, the faceplate 401 may be ultrasonically sealed to the housing 402 after the addressable optical NIU 400 is assembled at the factory, and hence is not removable in the field. This helps guard against subscribers removing the plug-in filter unit or otherwise tampering with the addressable optical NIU 400 in an effort to receive services without payment after the addressable optical NIU 400 is installed at the subscriber premises 20. In other embodiments, the faceplate 401 may be field removable so that service technicians can service and/or change the configuration of the addressable optical NIU 400 in the field. With such field serviceable models, a technician could, for example, insert or remove the plug-in filter circuit 480 in the field.

As shown in FIGS. 6A-6B, the addressable optical NIU 400 includes an optical input/output port 412 and a RF input/output (coaxial cable) port 490. The addressable optical NIU 400 includes a second coaxial cable port 404 that may receive a power signal that is used to power the device. As shown in FIG. 6C, the faceplate 401 includes a plug-in filter circuit 480 that is mounted on a printed circuit board 444.

As shown in FIG. 6C, a module 470 is mounted in the housing 402 that contains the FSK receiver, the microprocessor and a power supply. In certain embodiments of the present invention, this module 470 is a field removable and replaceable module. The module 470 may also include external electrical contacts that mate with other contacts in the housing 402, thereby allowing electrical signals and power to be transferred from the module 470 to other electrical components within the addressable optical NIU 400. As the module 470 includes several active components, it may be more prone to failure than the other components of the addressable optical NIU 400. Thus, if one of the active components contained in module 470 fails, the module may be replaced in the field instead of replacing the entire addressable optical NIU 400.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An addressable optical network interface unit ("NIU"), comprising:
    an optical input that is configured to connect to the cable television network;
    a radio frequency output that is coupled to a subscriber premise;
    an optical-to-electrical conversion circuit that is configured to convert optical signals received at the optical input into radio frequency signals;
    a first directional coupler that is coupled to an output of the optical-to-electrical conversion circuit;
    a radio frequency receiver that is coupled to a first output of the first directional coupler, the radio frequency receiver being configured to receive a radio frequency signal input through the optical input;
    a controller that is coupled to the radio frequency receiver;
    a filter circuit that is coupled to a second output of the first directional coupler, the filter circuit including a plurality of signal paths and a first filter that is on a first of the plurality of signal paths that filters out signals in a first range of frequencies and a second filter that is on a second of the plurality of signal paths that filters out signals in a second range of frequencies;
    a second directional coupler that is interposed between the first output of the first directional coupler and the radio frequency receiver; and
    a plurality of switches that select one of the plurality of signal paths through the filter circuit, wherein the plurality of switches are controlled in response to data contained in the radio frequency signal,
    wherein the controller is configured to generate a plurality of control signals that control the settings of at least some of the plurality of switches based at least in part on filter control signal received through the optical input, and
    wherein a first output of the second directional coupler is part of a feedback loop that controls an adaptive attenuator of the optical-to-electrical conversion circuit, and a second output of the second directional coupler is coupled to an input of the radio frequency receiver.

2. The addressable optical NIU of claim 1, wherein a third of the plurality of signal paths in the filter circuit bypasses both the first and second filters.

3. The addressable optical NIU of claim 2, wherein the first filter comprises a high pass filter and wherein the second filter comprises a band pass filter.

4. The addressable optical NIU of claim 2, wherein a first of the plurality of signal paths through the filter circuit passes signals in the downstream frequency band from the cable television network to the subscriber premise while attenuating signals in the upstream frequency band from the subscriber premise to the cable television network, wherein a second of the plurality of signal paths through the filter circuit passes signals in selected frequency ranges of the downstream frequency band from the cable television network to the subscriber premise and passes signals in selected frequency ranges in the upstream frequency band from the subscriber premise to the cable television network, and wherein a third of the plurality of signal paths through the filter circuit bypasses passes all signals in the downstream frequency band from the cable television network to the subscriber premise and all signals in the upstream frequency band from the subscriber premise to the cable television network.

5. The addressable optical NIU of claim 1, wherein the filter circuit comprises a plug-in filters circuit that is removably coupled to the addressable tap unit.

6. The addressable optical NIU of claim 5, further comprising an alternate communications path between the optical input and the radio frequency output that bypasses the filter circuit, wherein the addressable optical NIU is configured so that signals incident at the radio frequency input traverse the alternate communications path if the plug-in filter circuit is not installed in the addressable optical NIU.

7. The addressable optical NIU of claim 1, wherein the filter circuit includes a signal path that passes a frequency band associated with digital telephone emergency service while blocking at least a portion of the remainder of the frequency band associated with digital telephone emergency service.

8. The addressable optical NIU of claim 1, wherein the filter circuit comprises a bandpass filter that passes signals in at least some of a 60-110 MHz frequency range.

\* \* \* \* \*

UNITED STATES PATENT AND TRADEMARK OFFICE
CERTIFICATE OF CORRECTION

PATENT NO. : 8,566,896 B2
APPLICATION NO. : 12/910003
DATED : October 22, 2013
INVENTOR(S) : Riggsby et al.

It is certified that error appears in the above-identified patent and that said Letters Patent is hereby corrected as shown below:

In the Claims:
Column 15, Claim 4, Line 17: Please correct "bypasses passes all signals"
to read -- bypasses all signals --

Signed and Sealed this
Twenty-seventh Day of May, 2014

Michelle K. Lee
*Deputy Director of the United States Patent and Trademark Office*